United States Patent
Bussiere et al.

(10) Patent No.: US 7,380,244 B1
(45) Date of Patent: May 27, 2008

(54) STATUS DISPLAY TOOL

(75) Inventors: Gregory A. Bussiere, Portsmouth, RI (US); Rother V. Hodges, Wakefield, RI (US); Robert J. Pallack, Jr., Westport, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 707 days.

(21) Appl. No.: 10/847,020

(22) Filed: May 18, 2004

(51) Int. Cl.
*G06F 9/44* (2006.01)
*G06F 15/177* (2006.01)

(52) U.S. Cl. .................... 717/172; 715/736
(58) Field of Classification Search ......... 717/101–167
See application file for complete search history.

(56) References Cited

U.S. PATENT DOCUMENTS

| | | |
|---|---|---|
| 5,226,120 A | 7/1993 | Brown et al. |
| 5,652,839 A | 7/1997 | Giorgio et al. |
| 5,675,798 A | 10/1997 | Chang |
| 5,939,999 A | 8/1999 | Ohgaki |
| 6,070,190 A | 5/2000 | Reps et al. |
| 6,799,147 B1* | 9/2004 | Balasubramanian et al. ..... 702/186 |
| 7,113,934 B2* | 9/2006 | Levesque et al. ............... 707/1 |
| 7,185,075 B1* | 2/2007 | Mishra et al. ............... 709/223 |
| 7,260,818 B1* | 8/2007 | Iterum et al. ................ 717/170 |
| 2003/0133556 A1* | 7/2003 | Naik et al. .............. 379/201.12 |
| 2004/0064820 A1* | 4/2004 | Bussiere et al. ............ 719/310 |
| 2004/0085345 A1* | 5/2004 | Galou et al. ................. 345/734 |
| 2004/0250260 A1* | 12/2004 | Pioso .......................... 719/316 |

* cited by examiner

*Primary Examiner*—Mary Steelman
*Assistant Examiner*—Chih-Ching Chow
(74) *Attorney, Agent, or Firm*—James M. Kasischke; Jean-Paul A. Nasser; Michael P. Stanley

(57) ABSTRACT

In a distributed computing environment utilizing Common Object Request Broker Architecture (CORBA), a software status display tool that provides a graphical representation of the current operational status of all of the data sources in a computer network. The display tool accesses the CORBA Name Server and obtains all available references for object implementations and their CORBA Interface Definition Language (IDL) interface. The references and interfaces map directly to all of the data suppliers and servers and their respective interfaces. The display tool then interfaces with each and every supplier and server as if it were a corresponding client or consumer and based upon the data it is able to obtain it makes a determination of the state of that particular supplier or server. The display tool then logs the results of its determinations and presents a fundamental color-coded system-wide display of its determinations on a video device.

1 Claim, 5 Drawing Sheets

STATUS DISPLAY TOOL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

This patent application makes reference to a pending U.S. patent application entitled UNIVERSAL CLIENT AND CONSUMER, application Ser. No. 10/263,295 by the same inventors as this application.

BACKGROUND OF THE INVENTION (1) Field of the Invention

The present invention relates in general to computer networks, and more specifically to a method and apparatus that provides a display of the current operational status of all the data sources connected to a computer network.

(2) Description of the Prior Art

A common data processing system design utilizes a distributed computing environment where data is managed and disseminated over two or more interconnected computers. Such an interconnection of computers with the ability to communicate information between the computers is known as a computer network, or simply a network. Such networks may include a large number of components, including various types of computers and peripheral devices, which may be configured in a variety of ways and may be characterized as "Local Area Networks" (LANs) or "Wide Area Networks" (WANs) by the geographic area over which the components are distributed. LANs and WANs often employ several common configurations or architectures. For example, in a generic client/server configuration a certain number of the interconnected computers may function as clients while others may function as servers that provide services to the clients. Such a client/server configuration is a common example of the several available configurations of distributed computing environments (LANs and WANs) and is well known by those skilled in the art.

One manner of implementing software applications to run on a LAN or WAN is to use a vendor-independent network software architecture and infrastructure that various heterogeneous software applications can use to work together over the network. Such an implementation can be achieved using the "Common Object Request Broker Architecture" (CORBA) Specification. CORBA is a vendor independent specification for an architecture and infrastructure that promotes interoperability. It integrates computers from different vendors ranging in size from mainframes to desktops. CORBA provides a software bus that enables system applications to exchange and communicate information where such applications typically are distributed across a LAN or WAN. A CORBA based system relies on data abstraction to permit software applications running on the system to function unconstrained by the underlying network details, such as the types of workstations, the types of operating systems, and/or the programming languages of other application implementations. One of CORBA's most important, as well as most frequent uses is in network server applications that must handle a large number of clients, at high hit rates with high reliability. Applications utilizing CORBA are typically implemented and configured as either providers of data (servers and suppliers) or users of data (clients and consumers).

A large-scale distributed software system utilizing CORBA based architecture could have hundreds of servers/suppliers. In a large-scale system it may not be immediately obvious to a system manager whether all of the servers/suppliers are functioning properly or if a single server/supplier out of hundreds has failed. A number of software tools presently exist for gathering a variety of data from servers and/or clients in a distributed software system.

For example, U.S. Pat. No. 5,226,120 to Brown et al. for "Apparatus and Method of Monitoring the Status of a Local Area Network" (issued Jul. 6, 1993) teaches a monitoring and status displaying apparatus which determines the topology of a LAN by identifying and isolating each hub in the LAN and identifying the types of modules and the physical locations of the modules in the hub so that an image of the actual hub can be displayed on the video screen of the control console. The actual hub image shows the location and types of modules installed in the hub. However, this apparatus is oriented towards the managing and ascertaining of the specific physical layout of the hardware that composes the LAN. It does not monitor the processes running on the separate data terminal devices to determine if they are providing data appropriately nor does it display this information as status.

U.S. Pat. No. 5,675,798 to Chang for "System and Method for Selectively and Contemporaneously Monitoring Processes in a Multiprocessing Server" (issued Oct. 7, 1997) teaches a system for displaying the status of specific client applications running on a single multiprocessing server. The invention, by isolating and focusing on a specific client process, provides information of a granularity to identify processes which are hung up on semaphores, messages, queues or the like. The system employs a monitoring computer program running on the multiprocessing server which links control blocks to every process and displays information regarding the processes on a video display. Although this invention can provide a display of the status of a particular client process running on the server, it does not provide a system wide display of all servers and suppliers at once. There is no opportunity to obtain a complete system wide picture of which servers are operating and which are not. Also, this invention does not employ existing CORBA resources to achieve its results, but rather needs to employ additional performance monitoring code.

U.S. Pat. No. 5,939,999 to Ohgaki for "Polling Method and Apparatus for a Digital Processing System" (issued Aug. 17, 1999) teaches a digital processing system, such as transmission apparatus used in a digital communication system which employs a supervisory control unit and a plurality of controlled units each performing various processes. The supervisory control unit must perform a polling operation to each controlled unit to collect status information and determine whether any one of the controlled units is not mounted or has failed. Although the Ohgaki apparatus permits a considerable reduction of polling time over the prior art between the supervisory control unit and the plurality of controlled units, there is no display of such information to any type of graphical user interface.

U.S. Pat. No. 6,070,190 to Reps et al. for "Client-Based Application Availability and Response Monitoring and Reporting for Distributed Computing Environments" (issued May 30, 2000) teaches a method, system and program product for monitoring, from a client computer system, the performance of an application program residing on a server computer system connected to a LAN or WAN. A probe program residing at the client computer generates requests for the services of the application program and records transaction records based upon service responses from the server. The transaction records contain information such as whether a service response was made, the length of time to receive a response and other desired performance metrics. This information is stored in a database for statistical analysis and is also displayed on a graphical user interface. The goal is to monitor desired performance metrics of software applications running on servers from an end-user's vantage point. Although this invention can provide a display of the status of a particular process running on a server, it does not provide a system wide look at the status of all servers. Furthermore, it employs additional performance monitoring code in the form of a probe program incorporated into each client computer.

The above-described patents, while offering valuable information, do not by themselves provide the system manager of a large-scale distributed software system with a method and apparatus for easily and continuously ascertaining the system wide state of all of the servers/suppliers in real time. With such a method and apparatus, a system user might avoid a situation where he/she is unaware that a server or supplier is experiencing a loss of functionality until an undesired event occurs. System testers and maintenance personnel would also benefit from such a method and apparatus by quickly ascertaining the baseline status of the system and then quickly detecting and localizing a system problem to a particular server/supplier. In addition, it would be advantageous to provide such a method and apparatus without requiring additional performance monitoring code to be incorporated into each server/supplier application and without requiring a Simple Network Management Protocol (SNMP) agent to be running on all applicable hosts and an available system manager to oversee the system wide monitoring.

There is currently no method and apparatus which can provide a "quick look" status of all of the data sources of a data processing system utilizing CORBA architecture on a LAN which avoids incorporating performance monitoring code into each server/supplier application, avoids having an SNMP agent running on every host, enables a system operator or manager to determine the availability of system data, allows testers to determine the configuration of the system for a particular test and provides maintenance personnel a debugging capability to assist in troubleshooting of problems. What is needed is a status display tool for a multi-unit computer based network hosting a large-scale distributed software system.

SUMMARY OF THE INVENTION

It is a general purpose and object of the present invention to provide a method and apparatus that provides a display of the current operational status of all the system data sources in a computer network to a network user.

It is a further object that the display graphically depict the server/supplier availability for the entire system in real time.

It is still a further object to provide a display of the current operational status of all the system data sources through a graphical user interface viewable at any network video connection.

It is yet a further object that the operational status data be color coded to depict various states where, for example, one color represents the "data available" state and another represents the "invalid reference state."

Another object is that an audio signal be generated when a server/supplier transitions from an available state to an unavailable state.

Still another object is that the operational status information be periodically stored in a database for long-term statistical analysis.

These objects are accomplished with the present invention by creating generic client/consumer CORBA Interface Definition Language (IDL) interfaces to emulate all of the consumers or clients on the network. The generic consumer interface determines the state of suppliers that generate consumer specific periodic data by simply verifying that said data is being received at the specified periodicity. For the purposes of this invention, suppliers are considered to include the implementation of the standard Object Management Group (OMG) CORBA Object Services (Cos) Event Service. With aperiodic data suppliers an embedded "heartbeat" signal is detected in order to determine supplier availability. Similarly, the generic client interfaces periodically invoke an operation on their respective servers to ensure their availability. Based on the operation of the generic interfaces, the status of each server and supplier is displayed in the appropriate format through a graphical user interface.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
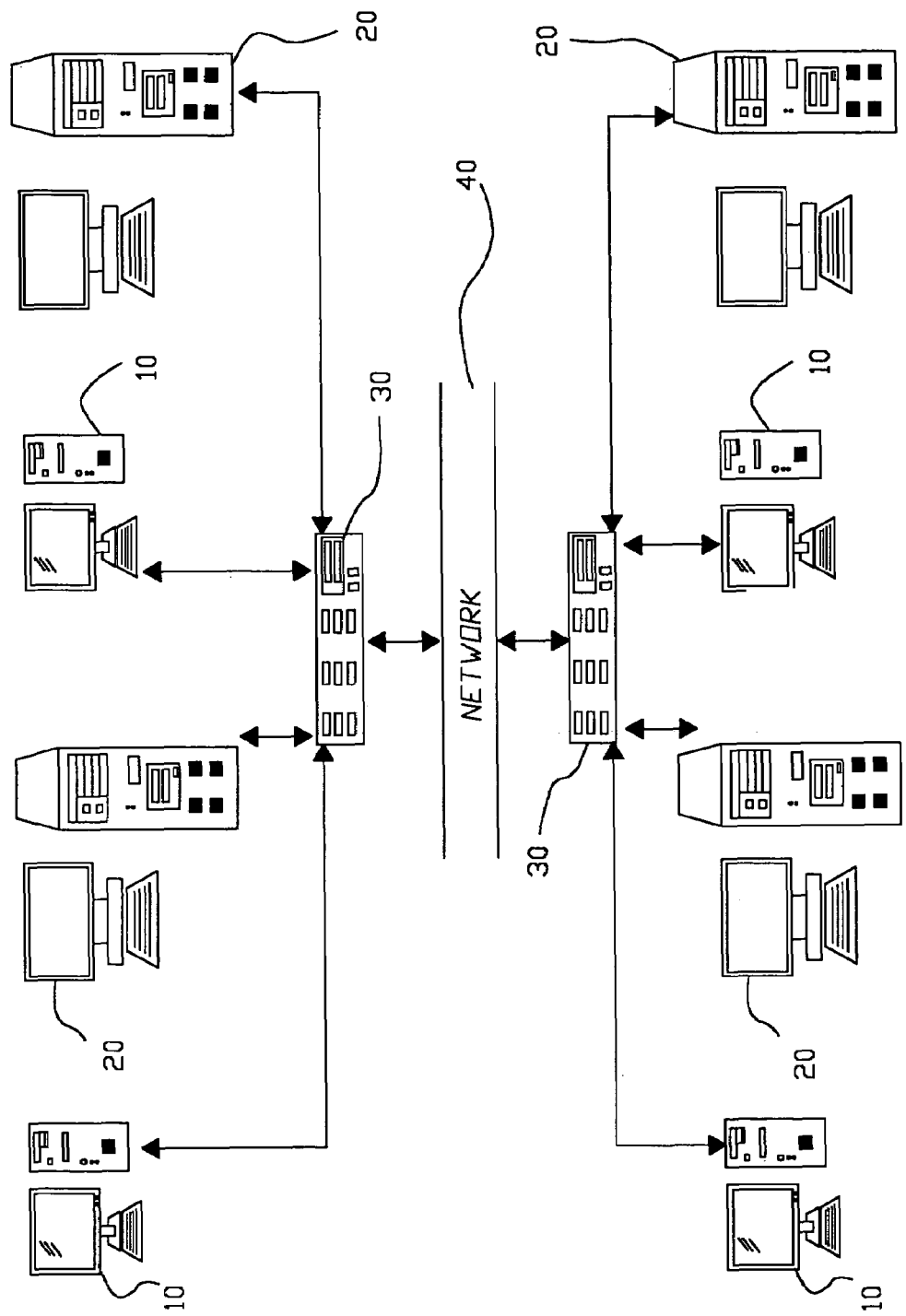
FIG. 1 shows a diagram depicting a typical client-server consumer-supplier network.

The present invention is designed for use in a client-server consumer-supplier network such as the one depicted in FIG. 1. Referring now to FIG. 1 there is shown one or more client/consumer computers 10, one or more server/supplier computers 20, each connected to a network hub 30. One or more network hubs 30 are in turn connected to the rest of the network 40. Note that at times a server/supplier computer may also function as a client/consumer computer, or that more than one server/supplier application may be running on a server/supplier computer. The clients/consumers 10 request services or data from the servers/suppliers 20. The requests and responses to the requests are implemented using CORBA resources.

Figure 2:
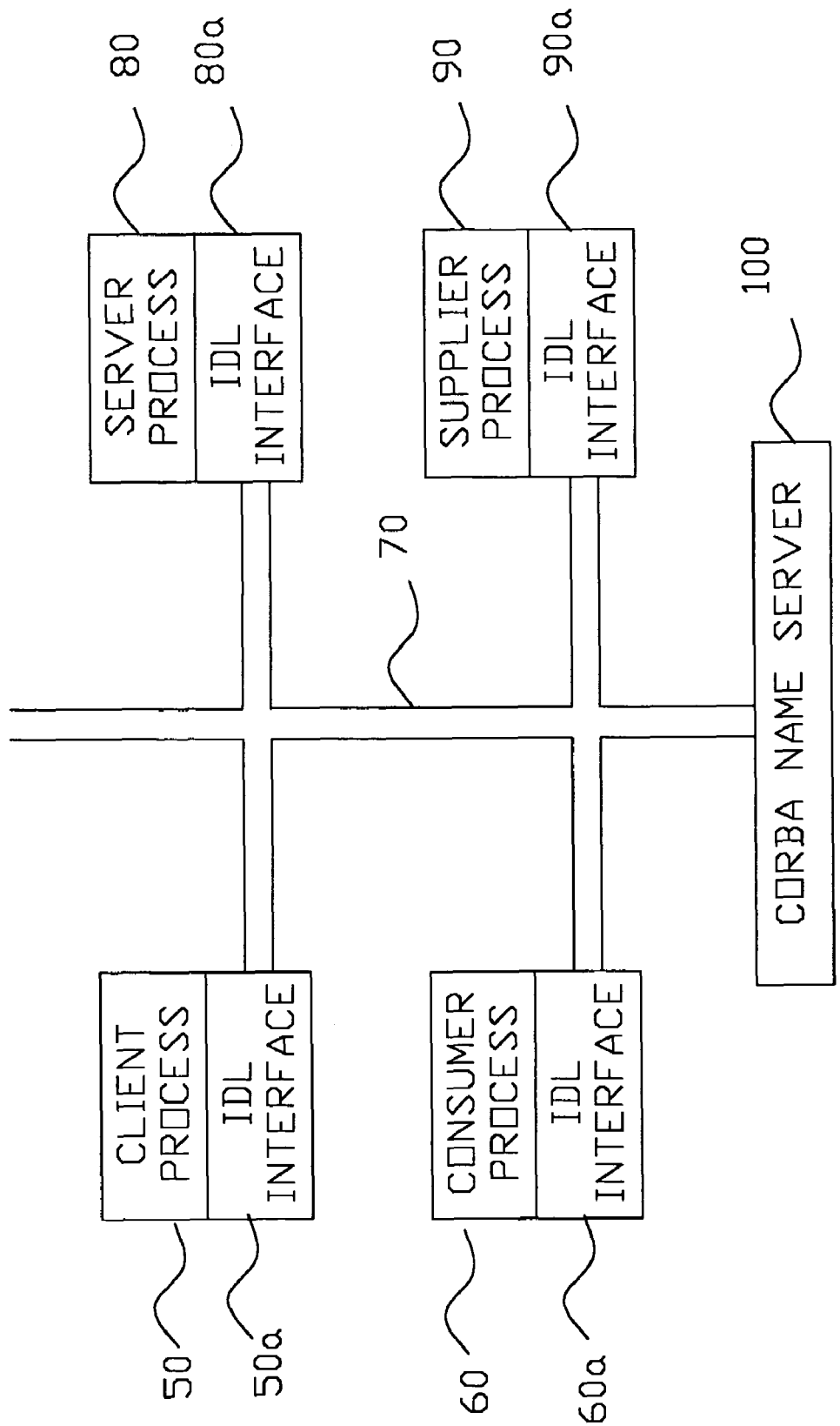
FIG. 2 shows a diagram of distributed software applications implemented on a CORBA based network system.

FIG. 2 shows distributed software applications implemented on a CORBA based network system. A typical client process (client) 50 or consumer process (consumer) 60 invokes services or requests data across the CORBA software bus 70 through their respective IDL interface 50a or 60a. Each server process (server) 80 or supplier/event process (supplier) 90 has a corresponding CORBA IDL interface 80a and 90a. In order to access a server 80 or supplier 90, the client 50 or consumer 60 must have a matching or corresponding interface 50a, 60a. The CORBA Name Server 100 (CNS) provides a repository for client processes 50 and consumer processes 60 to locate the correct server process 80 or supplier process 90. The client 50 or consumer 60 performs invocations on the server 80 or supplier 90 and responses proceed across the CORBA software bus 70 back to the invoking client 50 or consumer 60. In the case of a typical consumer, 60, after the initial consumer invocation, the consumer 60 no longer makes invocations, but receives invocations provided by the supplier 90. These supplier invocations are also called events. It is understood by those skilled in the art that the CORBA architecture consists of many other components which are not illustrated here.

Figure 3:
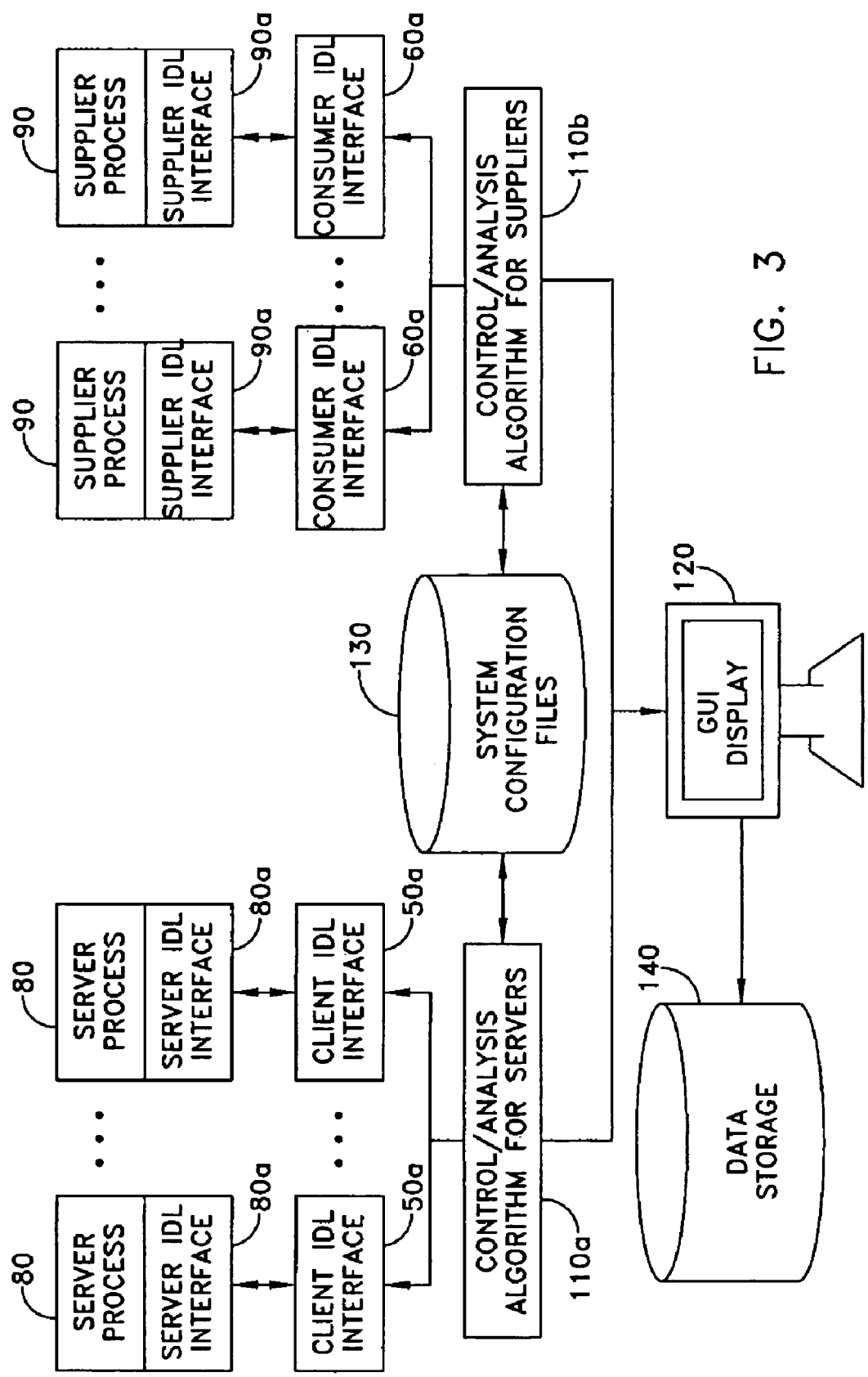
FIG. 3 shows a block diagram of the various components of the status tool.

A high-level block diagram of the status display tool is shown in FIG. 3. It includes the following components: control and analysis algorithms 110a and 110b, a graphical user interface (GUI) 120, system configuration files 130, and a data storage medium 140 which keeps a periodic status log. The tool identifies all servers 80 and suppliers 90 in the system, per the system configuration files 130. The system configuration files consist of system design data that has been predetermined and stored for use with the present invention. Then according to the instructions of the control and analysis algorithms 110a or 110b the tool generates the appropriate client or consumer IDL interfaces 50a or 60a to match the server and supplier interfaces 80a and 90a and invokes requests for data or services from the servers 80 and suppliers 90. The success or failure of the invocations is used to determine the appropriate status. The status is logged in the data storage medium 140 and displayed on the GUI 120.

Figure 4:
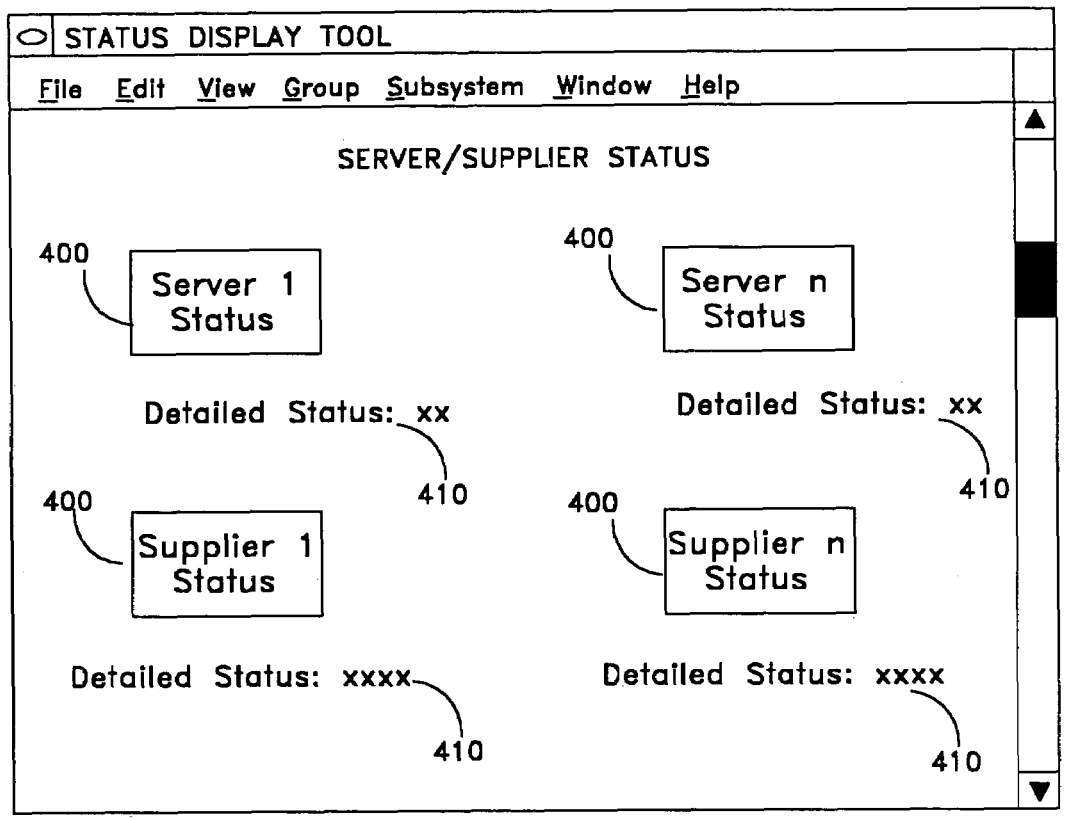
FIG. 4 shows a representation of a graphical display of the status information provided by the status tool.

FIG. 4 shows a representation of the status as displayed on the GUI. The user is able to obtain a quick assessment of the availability of the network system data from the GUI display. Each server/supplier is graphically depicted on the GUI by a rectangle 400. Each rectangle has an associated color (not shown) to depict the status of the server/supplier. Green indicates the server/supplier is available and is providing data as specified. Red indicates that the server/supplier cannot be connected to, and yellow indicates there is either no data or a problem with the data such as the data is out of range or is not being provided in a timely manner.

Associated with each indicator is a "detailed status" text area 410 that adds amplifying detail on the exact status such as "data available," "data out of range," "no object reference in the Name Server," etc. For example, if the server/supplier is yellow, the detailed status text area could state "Server # xxx data is out of range". In addition, an optional audio signal is generated when a server/supplier transitions from an available state to an unavailable state.

Figure 5:
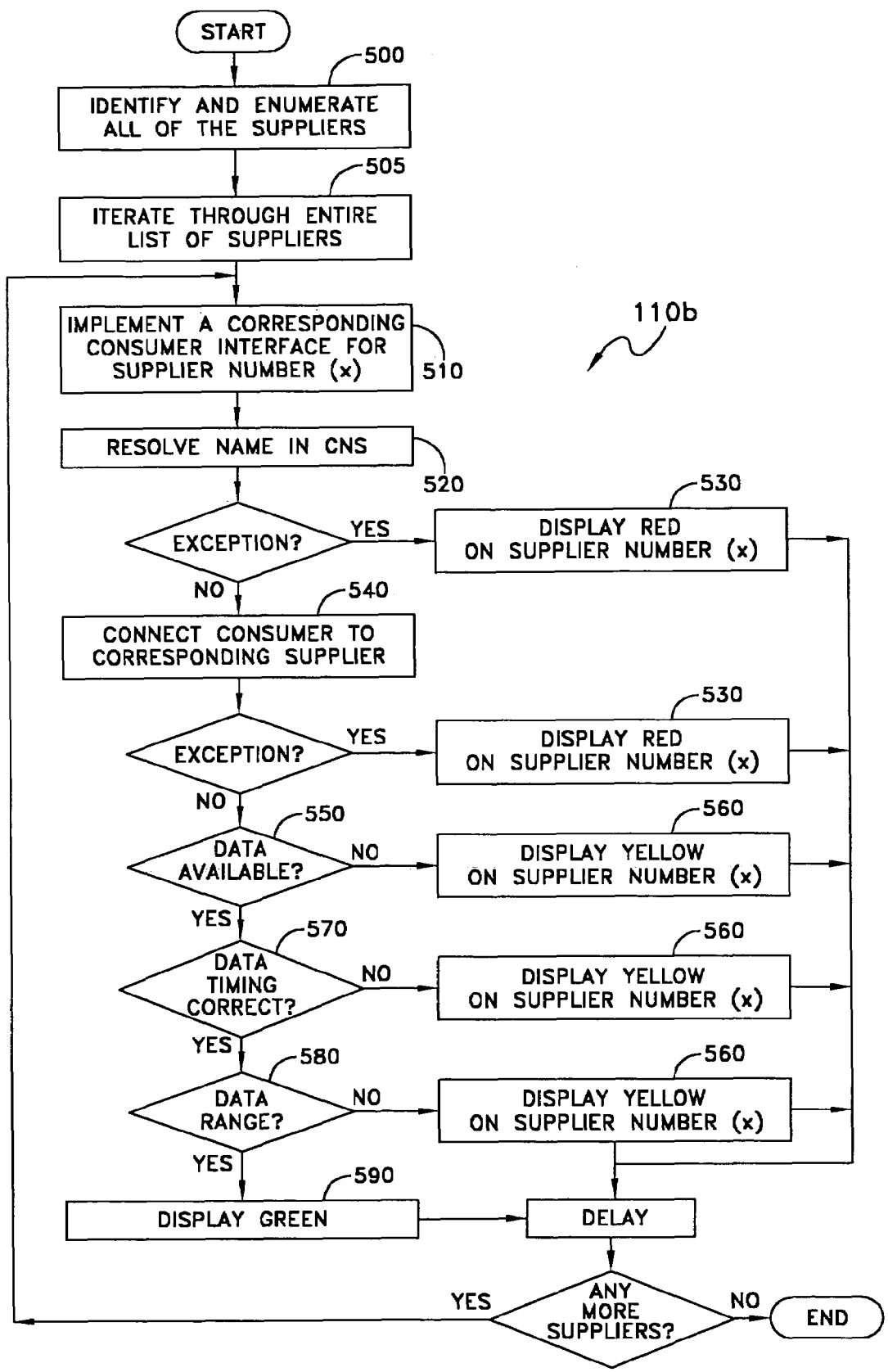
FIG. 5 shows a flow chart of the control/analysis algorithm for consumer interfaces.

The control/analysis algorithm 110b for suppliers is depicted in FIG. 5. This illustration uses the consumer supplier pair but is not so limited. In the first step 500, the tool identifies and enumerates all of the suppliers 90 in the system from the system configuration files 130. In the next step 505, the tool iterates through the entire list of suppliers performing the subsequent steps. In the next step 510, for each supplier 90 in the system the tool creates a consumer 60 with a corresponding CORBA IDL interface 60a. In a preferred embodiment, a Universal Client and Consumer utility creates the consumer as described in the pending U.S. patent application entitled UNIVERSAL CLIENT AND CONSUMER, application Ser. No. 10/263,295 by the same inventors as this application. In the following step 520, the tool utilizes the CORBA Name Service (CNS) 100 to resolve the name information from the system configuration file 130 with the name information in the CNS 100. If there is no corresponding match, the tool reflects this status by noting an exception and displaying a red icon 530 on the GUI 120. The tool then starts the process again for the next supplier 90 with a new corresponding consumer interface 60a. If the name is resolved without exception, then in step 540 consumer interface 60a utilizes the CNS 100 to connect to the respective supplier 90. If the consumer interface 60a is unable to connect to the supplier 90, then the tool reflects this status by displaying a red icon 530 on the GUI 120 and then starts the process again for the next supplier 90 with a new corresponding consumer interface 60a. If the consumer interface 60a is able to connect to the supplier 90 then the tool determines if the supplier 90 is providing data 550. If no data is available, the tool reflects this status by displaying a yellow icon 560 on the GUI 120 and then starts the process again for the next supplier 90 with a new corresponding consumer interface 60a. If data is available, then if the supplier 90 is a periodic event channel, the tool verifies that the data is being supplied at the correct rate 570. If the data timing is incorrect, the tool reflects this status by displaying a yellow icon 560 on the GUI 120 and then starts the process again for the next supplier 90 with a new corresponding consumer interface 60a. If the data timing is correct, then the tool proceeds to verify that the data it is receiving is within the specified range 580. If the data range is incorrect, the tool reflects this status by displaying a yellow icon 560 on the GUI 120 and then starts the process again for the next supplier 90 with a new corresponding consumer interface 60a. If the data range is correct, the tool reflects this status by displaying a green icon 590 on the GUI 120 and then, after a brief delay, if there are any more suppliers 90 starts the process again for the next supplier 90 with a new corresponding consumer interface 60a.

In order to verify data timing and range, the tool utilizes system design data that has been predetermined and stored in the systems configuration files 130. Depending on what data can be verified, the algorithm 110a determines the appropriate color for each supplier.

In the same manner as with the suppliers, the control/analysis algorithm for servers 110a implements a corresponding client interface 50a for each server 80 in the system and performs the same analysis. However, in the case of servers, the timing data verified is the amount of time it takes the client interface 50a to complete an invocation for services and then receive the service.

The advantages of the present invention over the prior art are that the status display tool provides a novel approach for determining the status of all CORBA data sources on a network in an automated and time saving fashion, rather than having a network manager individually manually test hundreds of servers and suppliers one at a time. The method and apparatus provides significant advantages over prior art, in that the desired status information is determined unobtrusively without having the servers or suppliers know that the information is being obtained. The method and apparatus does not use any external probes or monitoring process because but rather employs the existing available CORBA resources making it simpler and more efficient than the prior art.

What has thus been described is a method and apparatus that provides a display of the current operational status of all the data sources in a computer network to a network user. The display graphically depict the server/supplier availability for the entire system in real time through a graphical user interface viewable at any network video connection where the operational status data is color coded to depict various states. The operational status information is periodically stored in a database for long-term statistical analysis.

Obviously many modifications and variations of the present invention may become apparent in light of the above teachings. For example, implementation and use of the invention could be tailored to a closed network as on a ship, or a widely disbursed network like the Internet. The colors on the GUI display may vary, as may the detailed status messages. The status data provided by the invention can then be provided to a system manager and integrated in with network status to provide a complete picture of both the system hardware and software.

In light of the above, it is therefore understood that within the scope of the appended claims, the invention may be practiced otherwise than as specifically described.

What is claimed is:

1. A method for displaying the operational status of a plurality of data sources in a computer network having at least one distributed data source(s) and corresponding data user(s) utilizing a Common Object Request Broker Architecture (CORBA) that employs a CORBA name server, comprising the steps of:

building files containing a database of all data sources and system design data;

identifying all of the data sources in the computer network by referencing said database of data sources and system design data, wherein each data source has an interface definition language interface;

enumerating all of the identified data sources in the computer network by referencing said database of data sources and system design data;

generating a data display wherein each identified data source is graphically depicted as an icon on a graphical user interface wherein each icon has an associated color to depict the status of the identified data source, wherein the color green indicates the identified data source is available and is providing data;

implementing a generic data user having an interface definition language interface that corresponds to the interface definition language interface of an identified data source through the use of a Universal Client and Consumer utility for each identified data source;

validating that the identified data sources have corresponding names in the CORBA name server by resolving the name of each identified data source;

displaying a status based on color and a text message that indicates the result of the validating Step, wherein an exception is indicated by displaying the number of the data source in red and the text "no object reference in the Name Server";

establishing a communication link between the generic data user and the corresponding data source through the respective interface definition language interface of the generic data user the corresponding data source;

displaying a status based on color and a text message that indicates the result of the establishing a communication link step, wherein a failure to establish a communication link is indicated by displaying the number of the data source in red and the text "object not available";

determining data availability of the data source;

displaying a status based on color and a text message that indicates the result of the determining data availability step, wherein a lack of available data is indicated by displaying the number of the data source in yellow and the text "data not available";

determining data timing, of the data source by utilizing system design data that has been predetermined and stored in said database of data sources and system design data;

displaying a status based on color and a text message that indicates the result of the determining data timing step, wherein a determination that the data timing is incorrect is indicated by displaying the number of the data source in yellow;

determining data range of data source by utilizing system design data that has been predetermined and stored in said database of data sources and system design data; and displaying a status based on color and a text message that indicates the result of the determining data range of data source step, wherein inaccurate data is indicated by displaying the number of the data source in yellow.

* * * * *